(12) United States Patent
Shimizu et al.

(10) Patent No.: US 7,318,153 B2
(45) Date of Patent: Jan. 8, 2008

(54) MARK INFORMATION ISSUING METHOD AND SYSTEM

(75) Inventors: Tsuyoshi Shimizu, Tokyo (JP); Hajime Sasaki, Sapporo-shi (JP); Takashi Matsumoto, Tokyo (JP)

(73) Assignee: NTT Communications Corporation, Tokyo (JP)

( * ) Notice: Subject to any disclaimer, the term of this patent is extended or adjusted under 35 U.S.C. 154(b) by 487 days.

(21) Appl. No.: 10/474,201

(22) PCT Filed: Apr. 17, 2001

(86) PCT No.: PCT/JP01/03276

§ 371 (c)(1),
(2), (4) Date: Oct. 17, 2003

(87) PCT Pub. No.: WO02/086780

PCT Pub. Date: Oct. 31, 2002

(65) Prior Publication Data

US 2004/0133805 A1 Jul. 8, 2004

(51) Int. Cl.
*H04L 9/00* (2006.01)

(52) U.S. Cl. .................. 713/155; 713/156; 713/175; 713/176; 709/225; 709/226; 709/229; 709/232; 705/67

(58) Field of Classification Search ............... 713/155, 713/156, 175, 176; 709/232, 225, 226, 229; 705/67
See application file for complete search history.

(56) References Cited

U.S. PATENT DOCUMENTS 6,058,428 A * 5/2000 Wang et al. ............... 709/232
2002/0129255 A1 * 9/2002 Tsuchiyama et al. ....... 713/176

FOREIGN PATENT DOCUMENTS

| CN | 1253438 | 5/2000 |
| EP | 0 982 927 | 3/2000 |
| EP | 1 003 127 | 5/2000 |
| EP | 1 003 127 A2 | 5/2000 |
| JP | 2000-122977 | 4/2000 |
| JP | 2000-148686 | 5/2000 |
| JP | 2000-331088 | 11/2000 |
| JP | 2001-265721 | 9/2001 |

* cited by examiner

*Primary Examiner*—Kim Vu
*Assistant Examiner*—April Y. Shan
(74) *Attorney, Agent, or Firm*—Oblon, Spivak, McClelland, Maier & Neustadt, P.C.

(57) ABSTRACT

A mark issuing server operated by a mark issuer manages mark information collectively. A terminal of a user sends an information providing request to an information providing server of an information provider, and issues a mark issuing request to the mark issuing server on the basis of the information providing request. The information providing server searches for information corresponding to the information providing request from the terminal of the user, and provides the terminal of the user with information including requested information and location information of the mark issuing server. The mark issuing server determines validity of information provided from the information providing server on the basis of the mark issuing request, and sends a mark to the terminal of the user when the validity is verified, and the terminal of the user displays the mark with the information provided from the information providing server.

14 Claims, 9 Drawing Sheets

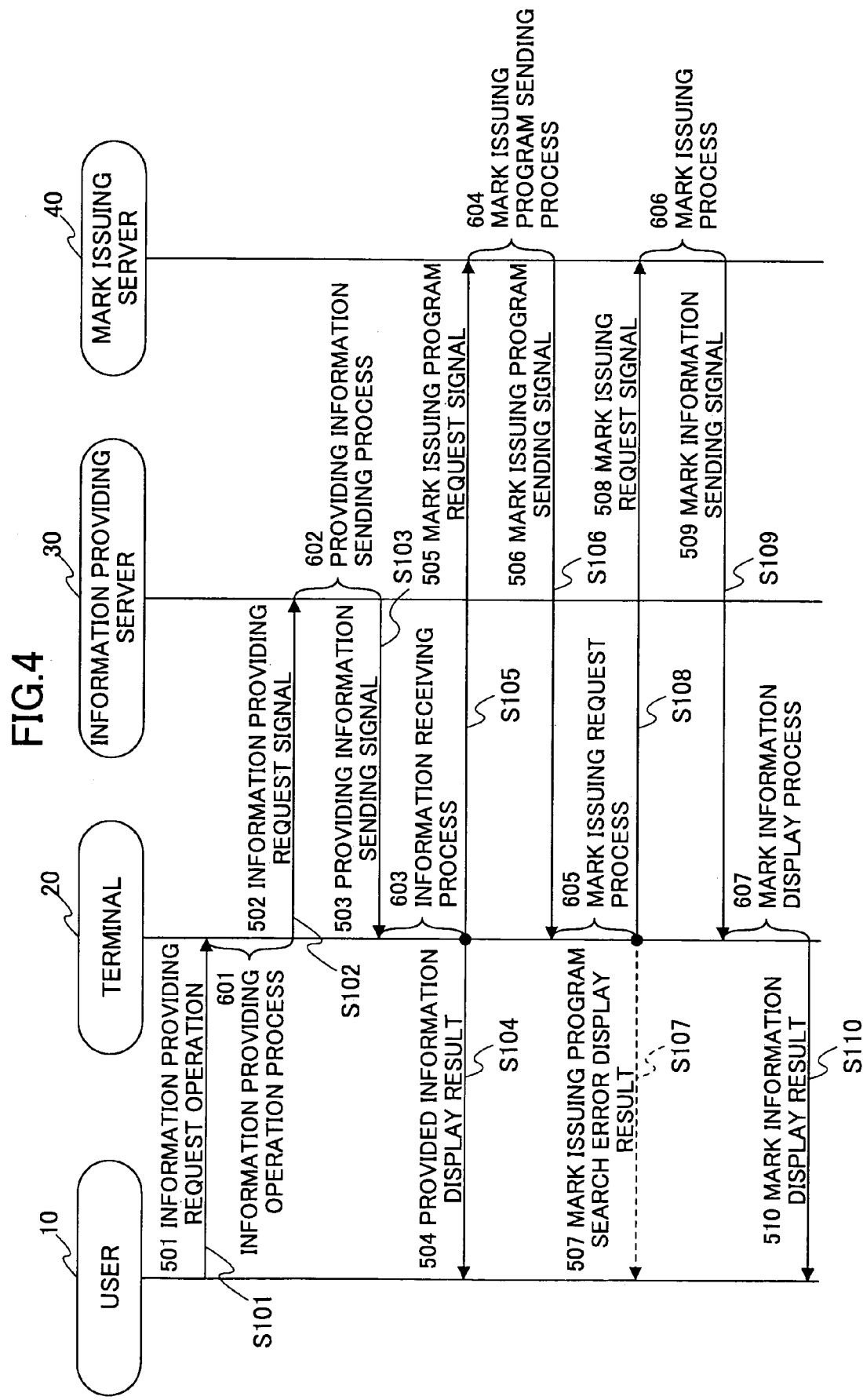

FIG.5

| LOCATION INFORMATION OF INFORMATION PROVIDING SERVER 30 | LOCATION INFORMATION OF PROVIDING INFORMATION | ADDITIONAL INFORMATION |

⎵ PROVIDING INFORMATION LOCATION IDENTIFIER

⎵ INFORMATION PROVIDING REQUEST IDENTIFIER

| LOCATION INFORMATION OF PROVIDING INFORMATION | PROVIDING INFORMATION |
|---|---|
| 1 | PROVIDING INFORMATION 1 |
| 2 | PROVIDING INFORMATION 2 |
| ⋮ | ⋮ |
| N | PROVIDING INFORMATION N |
| ⋮ | ⋮ |

| PROVIDING INFORMATION LOCATION IDENTIFIER | MARK ISSUING PROGRAM |
|---|---|
| PROVIDING INFORMATION LOCATION IDENTIFIER 1 | MARK ISSUING PROGRAM 1 |
| PROVIDING INFORMATION LOCATION IDENTIFIER 2 | MARK ISSUING PROGRAM 2 |
| ⋮ | ⋮ |
| PROVIDING INFORMATION LOCATION IDENTIFIER N | MARK ISSUING PROGRAM N |
| ⋮ | ⋮ |

FIG.10

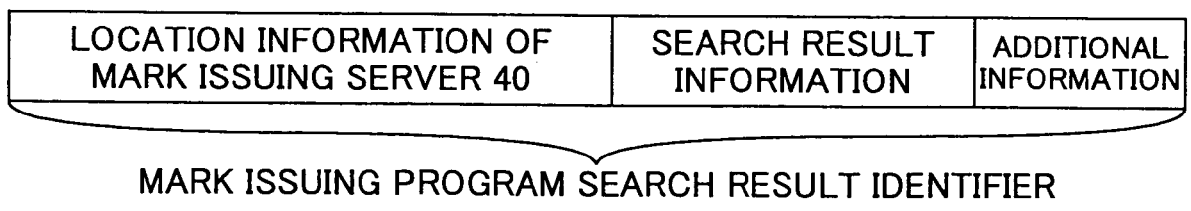

| LOCATION INFORMATION OF MARK ISSUING SERVER 40 | SEARCH RESULT INFORMATION | ADDITIONAL INFORMATION |

MARK ISSUING PROGRAM SEARCH RESULT IDENTIFIER

FIG.11

| LOCATION INFORMATION OF INFORMATION PROVIDING SERVER 30 | LOCATION INFORMATION OF PROVIDING INFORMATION |
|---|---|
| LOCATION INFORMATION OF INFORMATION PROVIDING SERVER 1 | LOCATION INFORMATION OF PROVIDING INFORMATION 1 |
| LOCATION INFORMATION OF INFORMATION PROVIDING SERVER 2 | LOCATION INFORMATION OF PROVIDING INFORMATION 2 |
| ⋮ | ⋮ |
| LOCATION INFORMATION OF INFORMATION PROVIDING SERVER N | LOCATION INFORMATION OF PROVIDING INFORMATION N |
| ⋮ | ⋮ |

FIG.12

| LOCATION INFORMATION OF MARK ISSUING SERVER 40 | DETERMINATION RESULT INFORMATION | ADDITIONAL INFORMATION |
|---|---|---|

MARK ISSUING DETERMINATION RESULT IDENTIFIER

FIG.13

| PROVIDING INFORMATION LOCATION IDENTIFIER | MARK INFORMATION |
|---|---|
| PROVIDING INFORMATION LOCATION IDENTIFIER 1 | MARK INFORMATION 1 |
| PROVIDING INFORMATION LOCATION IDENTIFIER 2 | MARK INFORMATION 2 |
| ⋮ | ⋮ |
| PROVIDING INFORMATION LOCATION IDENTIFIER N | MARK INFORMATION N |
| ⋮ | ⋮ |

FIG.14

| LOCATION INFORMATION OF MARK ISSUING SERVER 40 | ISSUE RESULT INFORMATION | ADDITIONAL INFORMATION |
|---|---|---|

MARK ISSUING RESULT IDENTIFIER

MARK INFORMATION ISSUING METHOD AND SYSTEM

TECHNICAL FIELD

The present invention relates to a mark information issuing method and the system. More particularly, the present invention relates to a mark information issuing method and the system for displaying a mark issued by a mark issuer on a part of information when a user obtains the information from an information provider and displays the information, in a network in which an indefinite number of users, the information provider and the mark issuer issuing the mark to be displayed on the part of the information exist.

BACKGROUND ART

When displaying a mark on a part of information provided by the information provider, the following technique is used. The mark issuer issues the mark information beforehand to the information provider. The information provider stores the mark information in an information providing server. According to a providing information display request by a user, the mark information together with providing information are obtained and displayed.

Also, there is a following technique. The mark issuer notifies the information provider of information on the location of the mark beforehand. The information provider embeds location information of the mark information in the providing information, and obtains the providing information and the mark information from the mark location, and displays the providing information and the mark information according to a display request of the user.

However, according to the above-mentioned conventional technologies, when displaying a mark on a part of information provided by the information provider, management of the issued marks depends on the information provider. Accordingly, for example, if the term of validity is set for issuing the mark, there is a problem in that the mark can be used invalidly since the information provider can issue the mark information even after the term of validity is expired.

In addition, since the mark provider notifies the information provider of the information on the location of the mark information beforehand, information for obtaining the mark information is embedded in the information provided by the information provider. Therefore, there is a problem in that an information provider that intends to use the mark information invalidly can produce providing information by using the location information and can provide the providing information from the information providing server as if to provide providing information validly.

DISCLOSURE OF THE INVENTION

The present invention is contrived in light of the above-mentioned problems. An object of the present invention is to provide a mark information issuing method and the system that can prevent invalid use of a mark such as use of a mark whose validity has expired and illegal copying of a mark so as to issue a mark properly by verifying an information provider one by one according to a mark issuing request of a user to a server operated by a mark issuer.

The above object is achieved by a mark information issuing method for displaying a mark issued by a mark issuer on a part of information when a user obtains the information and displays the information, in an network in which an indefinite number of users, the information provider and the mark issuer exist, wherein:

a mark issuing server operated by the mark issuer manages mark information collectively;

a terminal of the user sends an information providing request to an information providing server of the information provider, and issues a mark issuing request to the mark issuing server on the basis of the information providing request;

the information providing server searches for information corresponding to the information providing request, provides information including requested information and location information of the mark issuing server to the terminal of the user;

the mark issuing server determines validity of the information to be provided by the information providing server on the basis of the mark issuing request, and sends a mark to the terminal of the user when the validity is verified.

The above object is also achieved by a mark information issuing method for displaying a mark issued by a mark issuer on a part of information when a user obtains the information from an information provider and displays the information, in an network in which an indefinite number of users, the information provider and the mark issuer exist, wherein:

a mark issuing server operated by the mark issuer manages mark information collectively;

a terminal of the user sends an information providing request to an information providing server of the information provider, and issues a mark program issuing request to the mark issuing server on the basis of the information providing request;

the information providing server searches for information corresponding to the information providing request, provides information including requested information and location information of the mark issuing server to the terminal of the user;

the mark issuing server determines validity of the information to be provided by the information providing server on the basis of the mark program issuing request, and sends a mark program to the terminal of the user when the validity is verified; and the terminal of the user installs the mark program received from the mark issuing server.

The above object is also achieved by a mark information issuing system for displaying a mark issued by a mark issuing server on a part of information when a terminal of a user obtains the information from an information providing server and displays the information, in a network in which an indefinite number of terminals of users, the information providing server of an information provider and the mark issuing server of a mark issuer exist, the terminal of the user comprising:

information providing request means for issuing an information providing request for sending an information providing request to the information providing server of the information provider, and for issuing a mark issuing request to the mark issuing server on the basis of the information providing request;

providing information obtaining means for obtaining information corresponding to the information providing request from the information providing server, and for obtaining a mark corresponding to the mark issuing request from the mark issuing server; and display means for displaying information obtained by the providing information obtaining means;

the information providing server comprising:

request obtaining means for obtaining the information providing request from the terminal of the user; and information providing means for providing information including location information of the mark issuing server and the issuing request information on the basis of the information providing request;

the mark issuing server that is operated by the mark issuer comprising:

mark issuing request obtaining means for obtaining the mark issuing request from the terminal of the user;

mark issuing determination means for managing mark information collectively, and for determining validity of the information to be provided from the information providing server on the basis of the mark issuing request; and mark issuing means for sending a mark to the terminal of the user when the validity is verified by the mark issuing determination means.

The above object is also achieved by a mark information issuing system for displaying a mark issued by a mark issuing server on a part of information when a terminal of a user obtains the information from an information providing server and displays the information, in a network in which an indefinite number of terminals of users, the information providing server of an information provider and the mark issuing server of a mark issuer exist, the terminal of the user comprising:

information providing request means for issuing an information providing request for sending an information providing request to the information providing server of the information provider, and for issuing a mark issuing program request to the mark issuing server on the basis of the information providing request;

providing information obtaining means for obtaining information corresponding to the information providing request from the information providing server, and for obtaining a mark issuing program corresponding to the mark issuing program request from the mark issuing server; and means for installing the information obtained by the providing information obtaining means;

the information providing server comprising:

request obtaining means for obtaining the information providing request from the terminal of the user; and information providing means for providing information including location information of the mark issuing server and the issuing request information on the basis of the information providing request;

the mark issuing server that is operated by the mark issuer comprising:

mark issuing program request obtaining means for obtaining the mark issuing program request from the terminal of the user;

mark issuing program determination means for managing mark information collectively, and for determining validity of the information to be provided from the information providing server on the basis of the mark issuing program request; and mark issuing means for sending a mark issuing program to the terminal of the user when the validity is verified by the mark issuing program determination means.

As mentioned above, according to the present invention, mark information is collectively managed in the mark issuing server operated by the mark provider. When the user requests providing information from the information providing server, mark display request is automatically made from the user. Then, mark information is provided one by one from the mark issuing server after checking the validity of information provided by the information providing server. Accordingly, invalid use of a mark such as use of mark whose validity has expired and illegal copying of a mark can be prevented, so that mark issuing can be performed properly.

Other objects, features and advantages of the present invention will become more apparent from the following detailed description when read in conjunction with the accompanying drawings.

BRIEF DESCRIPTION OF THE DRAWINGS

FIG. 4 is a sequence chart of the mark information issuing system of the present invention;

FIG. 5 shows an example of an information providing request identifier according to an embodiment of the present invention;

FIG. 6 shows an example of content of a providing information storing part according an embodiment of the present invention;

FIG. 9 shows an example of content in a mark issuing program storing part according to an embodiment of the present invention;

FIG. 10 shows an example of a mark issuing program search result identifier according to an embodiment of the present invention;

FIG. 11 shows an example of content of a determination condition storing part according to an embodiment of the present invention;

FIG. 12 shows an example of a mark issuing determination result identifier according to an embodiment of the present invention;

FIG. 13 shows an example of content of a mark information storing part according to an embodiment of the present invention;

FIG. 14 shows an example of a mark issuing result identifier according to an embodiment of the present invention.

PREFERRED EMBODIMENTS FOR CARRYING OUT THE INVENTION

Figure 1:
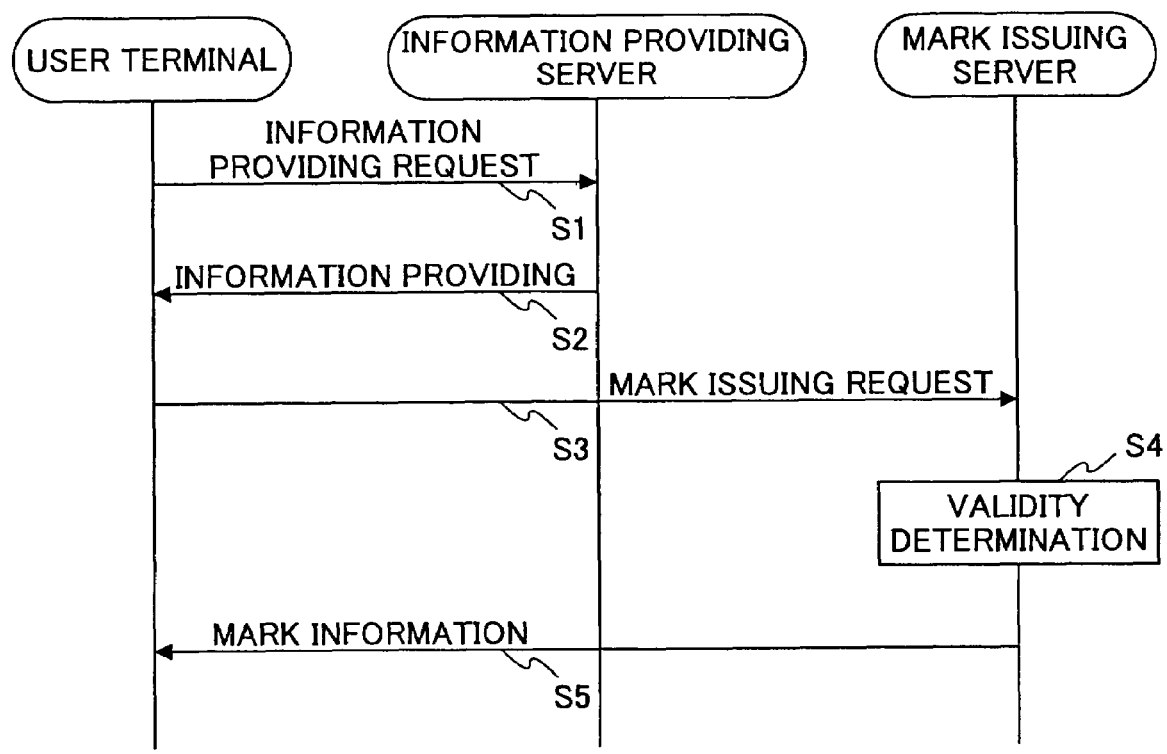
FIG. 1 is a figure for explaining the principle of the present invention.

First, a principle of the present invention will be described with reference to FIG. 1.

The present invention is a mark information issuing method for displaying a mark issued by the mark issuer on a part of information when a user obtains the information from the information provider and displays the information in a network in which an indefinite number of users, the information provider and the mark issuer exist.

In this method, a mark issuing server operated by the mark issuer manages the mark information collectively. A terminal of the user sends an information providing request to the information providing server of the information provider (step 1). In addition to that, the terminal issues an issuing request of a mark to a mark issuing server on the basis of the information providing request (step 3). Then, the information providing server searches for information corresponding to the information providing request from the terminal of the user, and provides information including requested information and location information of the mark issuing server to the terminal of the user (step 2). The mark issuing server determines validity of the information provided from the information providing server on the basis of the mark issuing request (step 4). When the validity is verified, the mark issuing server sends a mark to the terminal of the user (step 5).

Figure 2:
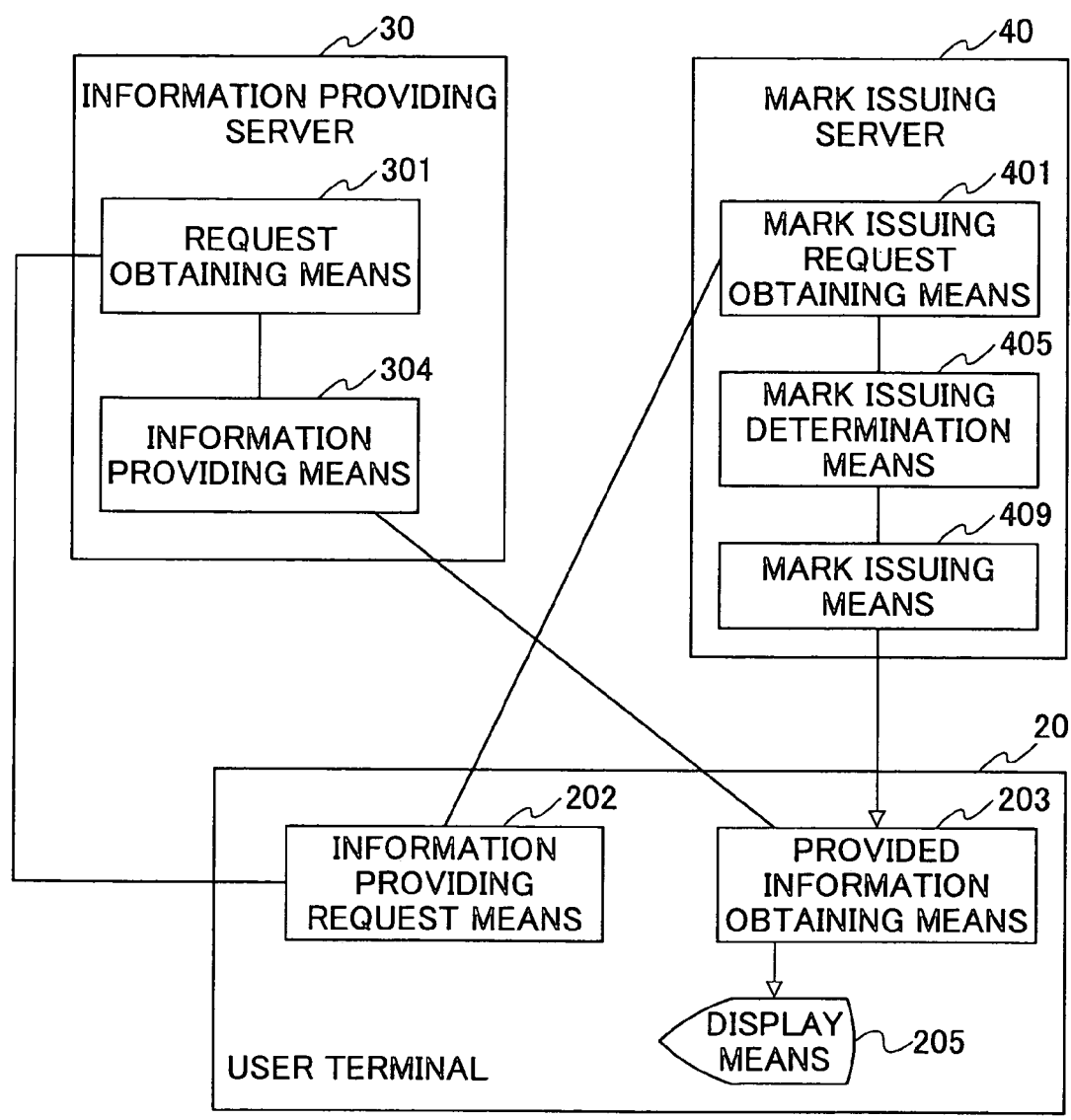
FIG. 2 shows a principle configuration of the present invention.

FIG. 2 shows a principle configuration of the present invention.

As shown in FIG. 2, the present invention is a mark information issuing system for displaying a mark issued by the mark issuer on a part of information when a terminal of the user obtains the information from the information provider and displays the information in a network in which an indefinite number of terminals of users, the information providing server of the information provider and the mark issuing server of the mark issuer exist. The terminal 20 of the user includes an information providing request means 202 for issuing an information providing request for requesting providing information to an information providing server of the information provider and for issuing a mark issuing request to a mark issuing server on the basis of the information providing request, a providing information obtaining means 203 for obtaining information corresponding to the information providing request from the information providing server and a mark corresponding to the mark issuing request from the mark issuing server, and a display means 205 for displaying information obtained by the providing information obtaining means.

The information providing server 30 includes a request obtaining means 301 for obtaining the information providing request sent from the terminal of the user, and an information providing means 304 for providing information including location information of the mark issuing server and issuing requested information to the terminal on the basis of the information providing request.

The mark issuing server 40 includes a mark issuing request obtaining means for obtaining the mark issuing request sent from the terminal 20 of the user, a mark issuing determination means 405 for managing mark information collectively in the mark issuing server operated by the mark issuer and for determining validity of the information provided by the information providing server according to the mark issuing request, and a mark issuing means 409 for sending a mark to the terminal of the user when the mark issuing determination means 405 verifies validity.

Figure 3:
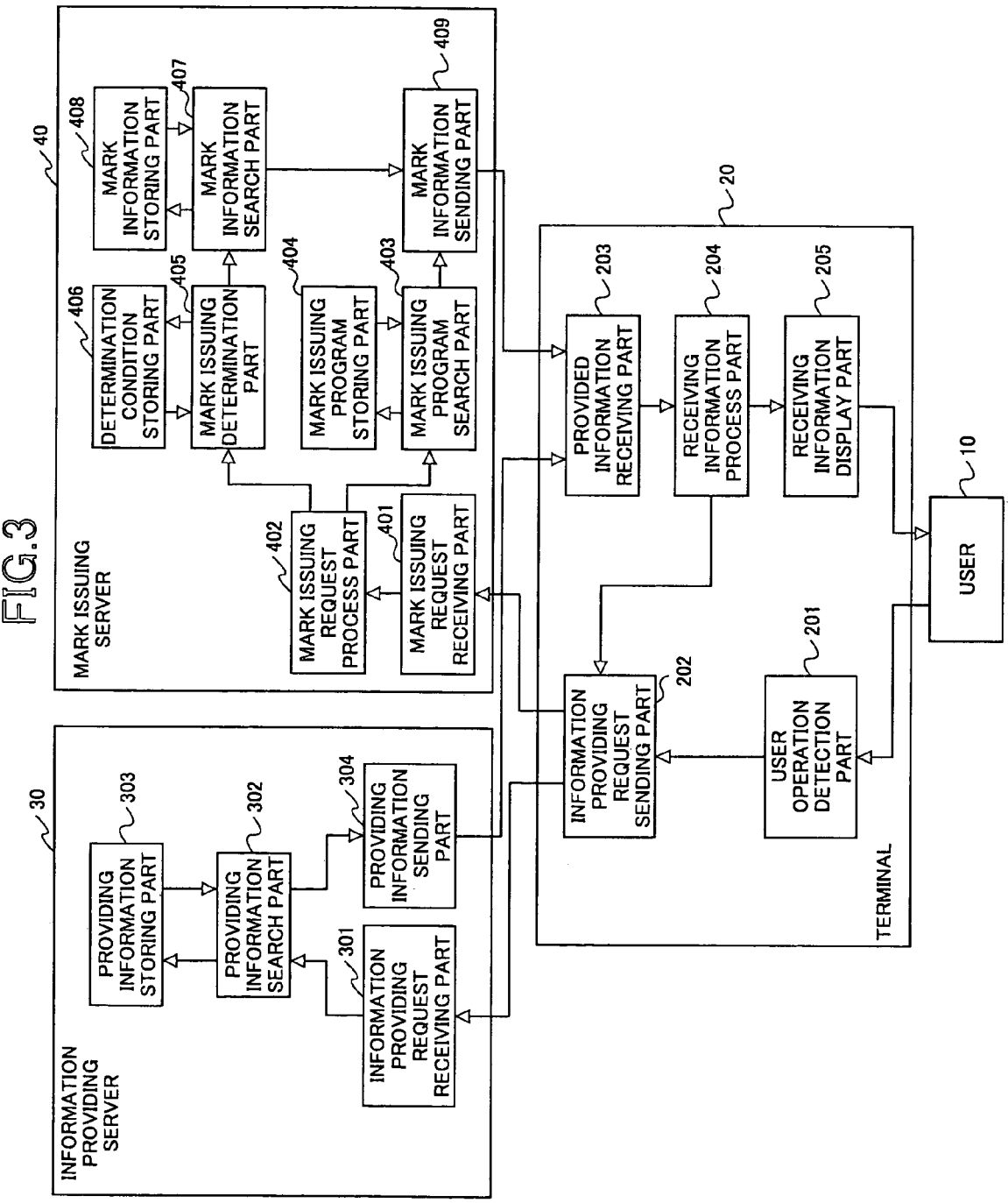
FIG. 3 shows a detailed configuration of a mark information issuing system of the present invention.

FIG. 3 shows a detailed configuration of the mark information issuing system of the present invention.

The system shown in the figure includes the terminal 20 operated by the user 10, the information providing server 30 including a mechanism for providing information to the terminal 20 by the information provider and the information, and the mark issuing server 40 including a mechanism for issuing the mark to the terminal 20 by the mark issuer and the information.

The terminal 20 includes a user operation detection part 201, an information providing request sending part 202, a provided information receiving part 203, a receiving information process part 204, and a receiving information display part 205.

The user operation detection part 201 detects an operation by the user 10. The information providing request sending part 202 receives a signal and sends a signal to the information providing server 30 and the mark issuing server 40. The provided information receiving part 203 receives signals from the information providing server 30 and the mark issuing server 40, and passes the signals to the receiving information process part 204.

The receiving information process part 204 receives the signal from the provided information receiving part 203 and processes the signal, and sends the signal to the information providing request sending part 202 and the receiving information display part 205.

The receiving information display part 205 receives the signal from the receiving information process part 204 and performs display process.

The information providing server 30 includes an information providing request receiving part 301, a providing information search part 302, a providing information storing part 303, and a providing information sending part 304.

The information providing request receiving part 301 receives a signal from the information providing request sending part 202 and sends the signal to the providing information search part 302.

The providing information search part 302 searches for providing information according to the signal from the information providing request receiving part 301 and sends the providing information.

The providing information storing part 303 stores information to be provided by the information provider beforehand. The providing information sending part 304 receives a signal from the providing information search part 302 and sends the signal.

The mark issuing server 40 includes a mark issuing request receiving part 401, a mark issuing request process part 402, a mark issuing program search part 403, a mark issuing program storing part 404, a mark issuing determination part 405, a determination condition storing part 406, a mark information search part 407, a mark information storing part 408 and a mark information sending part 409.

The mark request receiving part 401 receives a signal from the information providing request sending part 202 and sends the signal. The mark issuing request process part 402 performs processes according to a signal from the mark issuing request receiving part 401 and sends the signal.

The mark issuing program search part 403 searches the mark issuing program storing part 404 for a mark issuing program according to the signal from the mark issuing request process part 402 and sends the mark issuing program.

The mark issuing program storing part 404 stores the mark issuing program to be provided by the mark issuer beforehand.

The mark issuing determination part 405 searches the determination condition storing part 406 for a determination condition for issuing a mark according to the signal from the mark issuing request process part 402, and sends the determination result.

The determination condition storing part 406 stores determination conditions for determining whether a mark can be issued or not. The mark information search part 407 searches the mark information storing part 408 for mark information according to a signal from the mark issuing determination part 405 and sends the mark information.

The mark information storing part 408 stores mark information to be issued by the mark issuer beforehand.

The mark information sending part 409 receives a signal from the mark issuing program search part 403 or from the mark information search part 407 and sends a signal to the provided information receiving part 203.

Next, the operation of the above-mentioned configuration will be described.

FIG. 4 is a sequence chart of the mark information issuing system of the present invention.

Step 101) The user 10 performs an information providing request operation 501 on the terminal 20 for requesting providing information stored in the information providing server 30. The terminal 20 detects the information providing request operation from the user 10, and performs an information providing operation process 601 for producing an information providing request signal 502 including an information providing request identifier by using the user operation detection part 201 and the information providing request sending part 202.

Step 102) The terminal 20 sends an information providing request signal 502 to the information providing server 30. The information providing server 30 receives the information providing request signal 502 from the terminal 20, and the information providing server 30 performs providing information sending process 602 for producing providing information that includes display information and mark issuing request information by using the providing information receiving part 301, the providing information search part 302, the providing information storing part 303 and the providing information sending part 304.

Step 103) The information providing server 30 sends a providing information sending signal 503 to the terminal 20. The terminal 20 receives the providing information sending signal 503 from the information providing server 30, and performs receiving information process 603 by using the provided information receiving part 203, the receiving information process part 204 and the receiving information display part 205.

Step 104) The terminal 20 displays content of the display information as the providing information display result 504 for the user 10.

Step 105) The terminal 20 sends a mark issuing program request signal 505 that includes a mark issuing program request to the mark issuing server 40. The mark issuing server 40 receives the mark issuing program request signal 505 from the terminal 20, and performs a mark issuing program sending process 604 by using the mark issuing request receiving part 401, the mark issuing request process part 402, the mark issuing program search part 403, the mark issuing program storing part 404 and the mark information sending part 409.

Step 106) The mark issuing server 40 sends a mark issuing program sending signal 506 that includes the mark issuing program to the terminal 20. The terminal 20 receives the mark issuing program sending signal 506 from the mark issuing server 40, and performs mark issuing request process 605 by using the provided information receiving part 203, the receiving information process part 204 and the information providing sending part 202 and by executing the mark issuing program.

Step 107) If a mark issuing program search result included in the mark issuing program sending signal 505 indicates "search abnormal end", information of the search abnormal end is displayed on the terminal 20 for the user 10 as the mark issuing program search error display result 507.

Step 108) The terminal 20 sends a mark issuing request signal 508 including a mark issuing request to the mark issuing server 40. The mark issuing server 40 receives the mark issuing request signal 508 from the terminal 20, and performs a mark issuing process 606 by using the mark issuing request receiving part 401, the mark issuing request process part 402, the mark issuing determination part 405, the determination condition storing part 406, the mark information search part 407, the mark information storing part 408 and the mark information sending part 409.

Step 109) Only when the result of determination by the mark issuing determination part 407 indicates "issue possible" and corresponding mark information is included in the mark information storing part 409, the mark issuing server 40 sends a signal including mark information to the terminal 20 as a mark information sending signal 509. If the result of determination by the mark issuing determination part 407 indicates "issue impossible", the mark issuing server 40 sends a signal that includes information indicating that the determination result is "issue impossible" to the terminal 20 as the mark information sending signal 509. The terminal receives the mark information sending signal 509 from the mark issuing server 40, and performs mark information display process 607 by using the provided information receiving part 203, the receiving information process part 204 and the receiving information display part 205.

Step 110) When the mark information is included, the terminal 20 displays information to the user 10 in which mark information is displayed on a part of the providing information. When the mark information is not included, the terminal 20 displays providing information in which the mark is not displayed in an area where the mark should be displayed. In addition, the terminal 20 displays information indicating that the determination result is "issue impossible".

EMBODIMENTS

In the following, embodiments of the present invention will be described with reference to figures.

In the following embodiments, descriptions will be given according to the before-mentioned FIGS. 3 and 4.

FIG. 5 shows an example of the information providing request identifier according to an embodiment of the present invention. The figure shows an example of the information providing request identifier that includes a providing information location identifier and additional information, wherein the providing information location identifier includes location information of the information providing server 30 and location information of providing information, and information providing request identifier is included in the signal sent to the information providing request receiving part 301 of the information providing server 30, in which the signal is produced in the user operation detection part 201 according to the request of the user 10.

FIG. 6 shows an example of content of the providing information storing part according an embodiment of the present invention, in which FIG. 6 shows corresponding relationship between the location information of the providing information and the providing information that are stored in the providing information storing part 303 beforehand.

Figure 7:
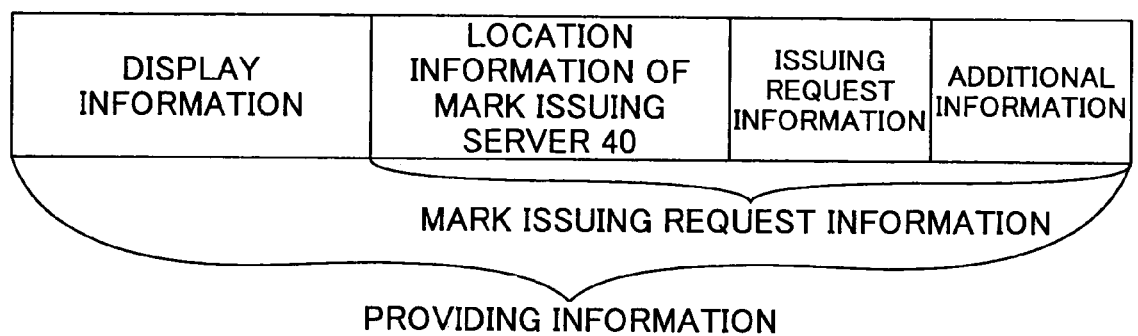
FIG. 7 shows an example of providing information according to an embodiment of the present invention.

FIG. 7 shows an example of the providing information according to an embodiment of the present invention. FIG. 7 shows an example of the providing information that includes mark issuing request information and display information, wherein the mark issuing request information includes location information of the mark issuing server 40, issuing request information and additional information, and the providing information is provided from the information providing server 30 according to a request by the user 10. The issuing request information is the mark issuing program request or the mark issuing request.

Figure 8:
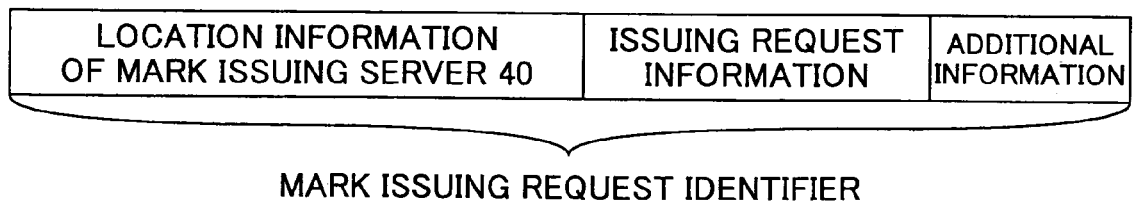
FIG. 8 shows an example of a mark issuing request identifier according to an embodiment of the present invention.

FIG. 8 shows an example of the mark issuing request identifier according to an embodiment of the present invention. FIG. 8 shows an example of the mark issuing request identifier that includes location information of the mark issuing server 40, issuing request information and additional information, wherein the mark issuing request identifier is produced by the receiving information process part 204 according to an signal from the information providing server 30.

FIG. 9 shows an example of content in the mark issuing program storing part according to an embodiment of the present invention. FIG. 9 shows an example of a table of corresponding relationship between the providing information location information identifier and the mark display program that are stored in the mark issuing program storing part 404 beforehand.

FIG. 10 shows an example of the mark issuing program search result identifier, wherein the mark issuing program search result identifier is produced according to the result of search of the mark issuing program storing part 404 according to a signal from the mark issuing request process part 402, and the mark issuing program search result identifier includes location information of the mark issuing server 40, search result information and additional information. The search result information is "search normal end" or "search abnormal end".

FIG. 11 shows an example of content of the determination condition storing part according to an embodiment of the present invention, and shows an example of a table indicating location information of the information providing server 30 and location information of providing information that are stored in the determination condition storing part 406 beforehand.

FIG. 12 shows an example of the mark issuing determination result identifier. The mark issuing determination result identifier shown in FIG. 12 is an example of the mark issuing determination result identifier that includes location information of the mark issuing server 40, the determination result information and additional information, wherein the mark issuing determination result identifier is produced according to the result of search of the determination condition storing part 406 according to the signal from the mark issuing request process part 402. The determination result information is "issue possible" or "issue impossible".

FIG. 13 shows an example of content of the mark information storing part according to an embodiment of the present invention. FIG. 13 shows an example of a table indicating corresponding relationship between providing information location identifier and mark information that are stored in the mark information storing part 408 beforehand.

FIG. 14 shows an example of a mark issuing result identifier according to an embodiment of the present invention. The identifier shown in FIG. 14 is an example of the mark issuing result identifier that includes location information of the mark issuing server 40, issuing result information and additional information. The issuing result information is "issue complete" or "search impossible".

In the following, the operation of this embodiment will be described with reference to FIG. 4.

When the user performs the information providing request operation 501 on the terminal 20 (step 101), the terminal 20 issues the information providing request signal 502 (information providing request identifier (FIG. 5)) to the information providing server 30 (step 102).

Then, the information providing server 30 searches the providing information storing part 303 shown in FIG. 6 by using the providing information location identifier, and provides the terminal 20 with the providing information sending signal 503 (providing information (FIG. 7)) (step 103).

Then, the terminal 20 displays the providing information display result 504 to display the providing information for the user 10 (step 104).

Next, when installing a program in the terminal 20, the terminal 20 issues the mark issuing program request signal 505 (mark issuing request identifier (FIG. 8)) to the mark issuing server 40 (step 105). The mark issuing server 40 searches the mark issuing program storing part 404 according to the mark issuing request identifier. Then, the mark issuing server 40 sends the mark issuing program sending signal 506 (mark issuing program search result identifier (FIG. 10)) to the terminal 20 (step 106). If abnormal end occurs, an error is set in "search result information" in the mark issuing program search result identifier. Accordingly, the terminal 20 displays the mark issuing program search error display result 507 to the user 10 for showing error information (step 107).

When the terminal 20 requests issuing of mark from the mark issuing server 40, the terminal 20 sends the mark issuing request signal 508 to the mark issuing server 40 (step 108). The mark issuing server 40 searches the determination condition storing part 406 on the basis of the mark issuing request signal 508. If the determination condition is satisfied, "issue possible" is set in the determination result of the mark issuing determination result identifier (FIG. 12). When "issue possible" is set in the mark issuing determination result identifier, the mark information search part 407 searches the mark information storing part 408 so as to set one of "search impossible", "issue complete" and "issue impossible" in the mark issuing result identifier (FIG. 14). If the search is successfully done, the mark issuing server 40 sends the mark information sending signal 509 to the terminal 20 (step 109).

Accordingly, the terminal 20 displays the mark information display result to the user 10 (step 110).

Although, in the above-mentioned operations, an example is explained in which the mark issuing server issues the mark, the mark program can be provided to the terminal 10 of the user in the same way.

In addition, in the above-mentioned embodiment, the mark issuing program can be any program as long as it can be executed on the client side.

In addition, the mark can be issued to the user 10 by executing a program on the mark issuing server 40 without executing the mark issuing program on the terminal 20 of the user 10.

In addition, a plurality of information providing servers 30 and a plurality of mark issuing servers 40 may exist.

As mentioned above, according to the present invention, mark information is collectively managed in the mark issuing server operated by the mark provider. When the user requests providing information from the information providing server, mark display request is automatically made from the user. Then, mark information is provided one by one from the mark issuing server after checking validity of information provided by the information providing server. Accordingly, invalid use of mark such as use of mark whose validity has expired and illegal copy of mark can be prevented, so that mark issuing can be performed properly.

The present invention is not limited to the specifically disclosed embodiments, and variations and modifications may be made without departing from the scope of the invention.

The invention claimed is:

1. A mark information issuing method for displaying a mark issued by a mark issuer on a part of information provided by an information providing server of an information provider when a user obtains the information and displays the information, in a network in which an indefinite number of users, the information provider and the mark issuer exist, wherein:

a terminal of the user sends an information providing request to the information providing server of the information provider including location information of the information providing server and location information of requested information to be provided by the information providing server;

the information providing server searches for the requested information corresponding to the information providing request, and provides the requested information corresponding to the information providing request and location information of the mark issuing server to the terminal of the user;

the terminal of the user displays the requested information and issues a mark issuing request including a providing information location identifier to the mark issuing server using the location information of the mark issuing server;

a mark issuing server operated by the mark issuer manages mark information collectively associating the mark information with the providing information location identifier that includes the location information of the information providing server and the location information of the requested information provided by the information providing server;

the mark issuing server determines validity of the requested information provided by the information providing server on the basis of the mark issuing request, and sends the mark corresponding to the requested information to the terminal of the user when the validity is verified; and the terminal of the user displays the mark.

2. The mark information issuing method as claimed in claim 1, wherein: in the step in which the terminal of the user issues the mark issuing request, the terminal of the user sends a mark issuing program request to the mark issuing server using the location information of the mark issuing server, the mark issuing server sends a mark issuing program to the terminal, and the terminal sends the mark issuing request to the mark issuing server by executing the mark issuing program.

3. A mark information issuing system for displaying a mark issued by a mark issuing server on a part of information provided by an information providing server of an information provider when a terminal of a user obtains the information from an information providing server and displays the information, in a network in which an indefinite number of terminals of users, the information providing server of the information provider and the mark issuing server of a mark issuer exist, the terminal of the user comprising:

information providing request means for issuing an information providing request to the information providing server of the information provider, including location information of said information providing server and location information of requested information to be provided by said information providing server, and for issuing a mark issuing request to the mark issuing server on the basis of the information providing request;

providing information obtaining means for obtaining the requested information corresponding to the information providing request from the information providing server, and for obtaining the mark corresponding to the mark issuing request from the mark issuing server; and display means for displaying the requested information obtained by the providing information obtaining means;

the information providing server comprising:

request obtaining means for obtaining the information providing request from the terminal of the user; and information providing means for providing the requested information to the terminal including location information of the mark issuing server and issuing request information on the basis of the information providing request;

the mark issuing server that is operated by the mark issuer comprising:

mark issuing request obtaining means for obtaining the mark issuing request from the terminal of the user;

mark issuing determination means for managing mark information collectively and associating the mark information with a providing information location identifier that includes the location information of the information providing server and the location information of the information provided by the information providing server, and for determining validity of the requested information provided from the information providing server on the basis of the mark issuing request; and mark issuing means for sending the mark to the terminal of the user when the validity is verified by the mark issuing determination means.

4. A mark information issuing system for displaying a mark issued by a mark issuing server on a part of information provided by an information providing server of an information provider when a terminal of a user obtains the information and displays the information, in a network in which an indefinite number of terminals of users, the information providing server of the information provider and the mark issuing server of a mark issuer exist, the terminal of the user comprising:

information providing request means for issuing an information providing request to the information providing server of the information provider, and for issuing a mark issuing program request to the mark issuing server on the basis of the information providing request;

means for sending location information of said information providing server and location information of requested information to said information providing server when sending said information providing request;

providing information obtaining means for obtaining requested information corresponding to the information providing request from the information providing server, and for obtaining a mark issuing program corresponding to the mark issuing program request from the mark issuing server; and means for installing the requested information obtained by the providing information obtaining means;

the information providing server comprising:

request obtaining means for obtaining the information providing request from the terminal of the user; and information providing means for providing the requested information to the terminal including location information of the mark issuing server and issuing request information on the basis of the information providing request;

the mark issuing server that is operated by the mark issuer comprising:

mark issuing program request obtaining means for obtaining the mark issuing program request from the terminal of the user;

mark issuing program determination means for managing mark information collectively and associating the mark information with a providing information location identifier that includes the location information of the information providing server and the location information of the information provided by the information providing server, and for determining validity of the requested information provided from the information providing server on the basis of the mark issuing program request; and mark issuing means for sending a mark issuing program to the terminal of the user when the validity is verified by the mark issuing program determination means.

5. The mark information issuing system as claimed in claim 3, wherein:

the terminal of the user sends a mark issuing program request to the mark issuing server using the location information of the mark issuing server, the mark issuing server sends a mark issuing program to the terminal, and the terminal sends the mark issuing request to the mark issuing server by executing the mark issuing program.

6. The mark information issuing method as claimed in claim 1, comprising:

said mark issuing server locating a mark issuing program using said providing information identifier, and sending said mark issuing program to said terminal.

7. The mark information issuing method as claimed in claim 6, comprising:

said terminal receiving said mark issuing program, and executing said mark issuing program to generate said mark issuing request.

8. The mark information issuing method as claimed in claim 1, comprising:

said mark issuing server providing said mark to said terminal through said network.

9. The mark information issuing system as claimed in claim 3, wherein said terminal comprises:

means for sending, as said mark issuing request, said issuing request information and said location information of said mark issuing server to said mark issuing server.

10. The mark information issuing method system as claimed in claim 9, wherein said mark issuing determination means comprises:

means for locating a mark issuing program using said issuing request information and sending said mark issuing program to said terminal.

11. The mark information issuing system as claimed in claim 10, wherein said terminal comprises:

means for receiving said mark issuing program, and executing said mark issuing program to generate said mark issuing request.

12. The mark information issuing system as claimed in claim 4, wherein said terminal comprises:

means for sending, as said mark issuing request, said issuing request information and said location information of said mark issuing server to said mark issuing server.

13. The mark information issuing system as claimed in claim 12, wherein said mark issuing program determination means comprises:

means for locating said mark issuing program using said issuing request information and sending said mark issuing program to said terminal.

14. The mark information issuing system as claimed in claim 13, wherein said terminal comprises:

means for receiving said mark issuing program, and executing said program to generate said mark issuing request.

* * * * *